United States Patent

Queveau et al.

[11] Patent Number: 6,131,988
[45] Date of Patent: Oct. 17, 2000

[54] THREE-PART FOLDING ROOF FOR CONVERTIBLE VEHICLES

[75] Inventors: Gérard Queveau; Paul Queveau; Jean-Marc Guillez, all of Cerizay, France

[73] Assignee: France Design, Cerizay, France

[21] Appl. No.: 09/307,928

[22] Filed: May 10, 1999

[30] Foreign Application Priority Data

May 12, 1998 [FR] France .................................. 98 05971

[51] Int. Cl.[7] ........................................................... B60J 7/00
[52] U.S. Cl. ........................ 296/107.17; 296/108; 296/116
[58] Field of Search ............................. 296/108, 107.16, 296/107.17, 116, 117, 146.14, 107.07

[56] References Cited

U.S. PATENT DOCUMENTS

| | | | |
|---|---|---|---|
| 2,704,225 | 3/1955 | Anschuetz et al. | 296/108 |
| 4,729,592 | 3/1988 | Tuchiya et al. | 296/107.16 |
| 5,195,798 | 3/1993 | Klein et al. | 296/146.14 |
| 5,209,544 | 5/1993 | Benedetto et al. | 296/146.14 |
| 5,335,959 | 8/1994 | Schrader et al. | 296/108 |
| 5,490,709 | 2/1996 | Rahn | 296/108 |
| 5,520,432 | 5/1996 | Gmeiner et al. | 296/108 |
| 5,533,777 | 7/1996 | Kleemann et al. | 296/117 |
| 5,542,735 | 8/1996 | Fiirst et al. | 296/146.14 |
| 5,558,388 | 9/1996 | Fiirst et al. | 296/117 |
| 5,746,470 | 5/1998 | Seel et al. | 296/108 |
| 5,769,483 | 6/1998 | Danzl et al. | 296/108 |
| 5,785,375 | 7/1998 | Alwxander et al. | 296/108 |
| 5,833,300 | 11/1998 | Russke | 296/108 |
| 5,944,375 | 8/1999 | Schenk et al. | 296/108 |
| 5,971,470 | 10/1999 | May et al. | 296/107.16 |
| 5,979,970 | 11/1999 | Rothe et al. | 296/107.17 |
| 5,988,729 | 11/1999 | Klein | 296/107.07 |
| 6,019,416 | 2/2000 | Beierl | 296/107.17 |
| 6,039,383 | 3/2000 | Jambor et al. | 296/108 |

FOREIGN PATENT DOCUMENTS

| | | | |
|---|---|---|---|
| 0 678 411 | 10/1995 | European Pat. Off. . | |
| 002695081 | 3/1994 | France | 296/108 |
| 39 03 358 | 8/1990 | Germany . | |
| 004316485 | 11/1994 | Germany | 296/108 |
| 44 35 222 | 11/1995 | Germany . | |
| 2240519 | 8/1991 | United Kingdom | 296/108 |

Primary Examiner—Joseph D. Pape
Assistant Examiner—Kiran Patel
Attorney, Agent, or Firm—Kenyon & Kenyon

[57] ABSTRACT

A folding roof for convertible vehicles includes a front roof part hinged to a rear roof part whose rear end is hinged to the vehicle. The front and rear roof parts can be stowed in the trunk of the vehicle with the front roof part folded over the rear roof part connected to its hinge to the vehicle. The rear roof part has a central roof part hinged to the rear roof part, extending as far as the hinge between the front and rear roof parts and cooperating with an arrangement which, when the roof is stowed in the trunk, holds the central roof part at a distance above the rear roof part.

8 Claims, 4 Drawing Sheets

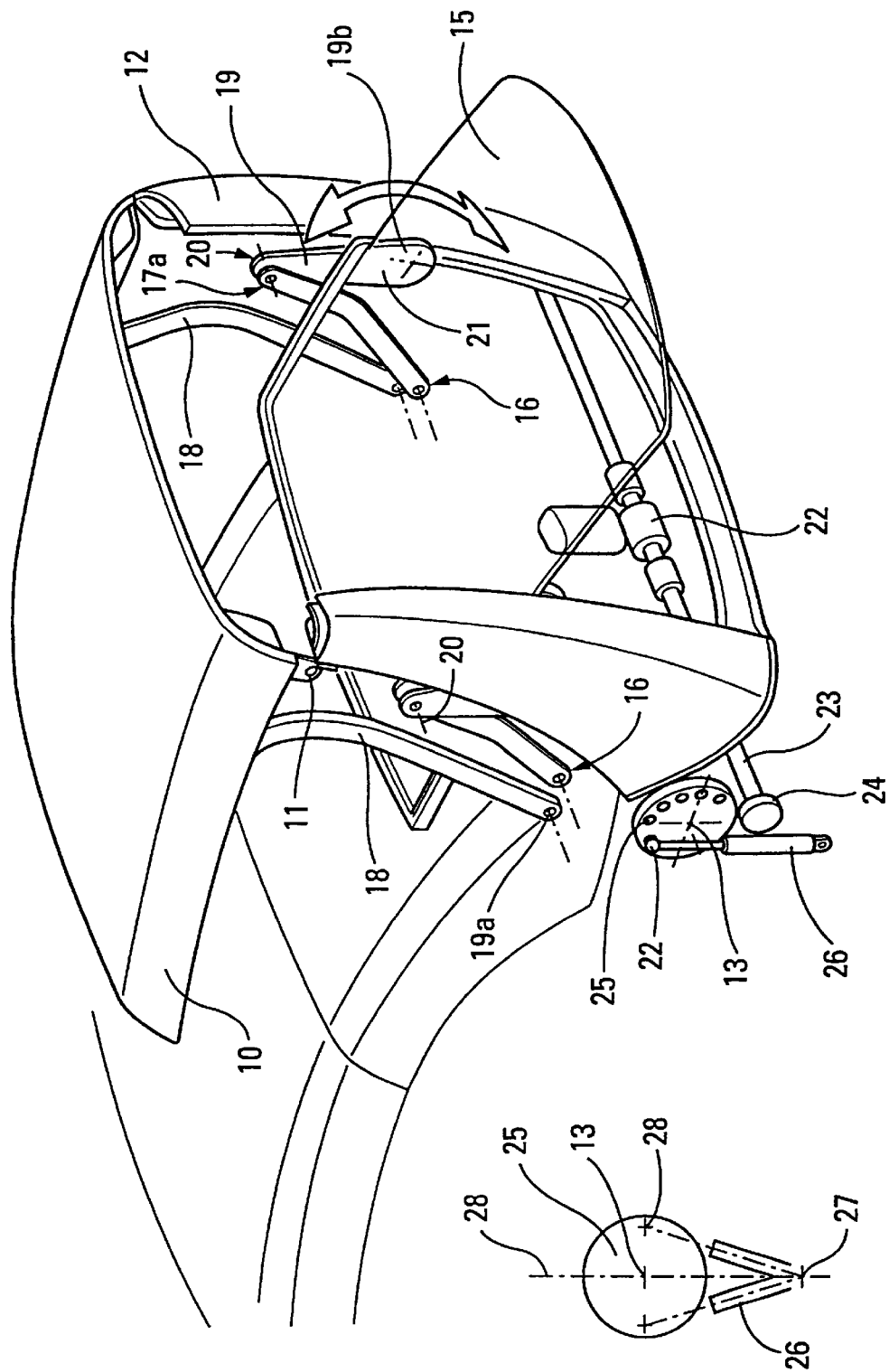

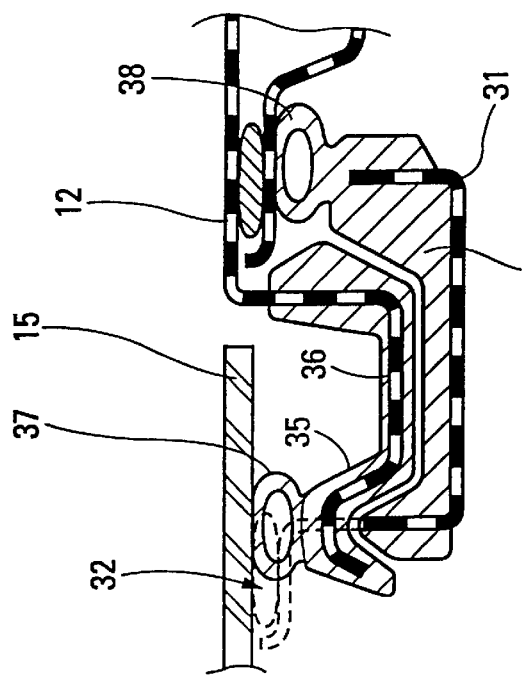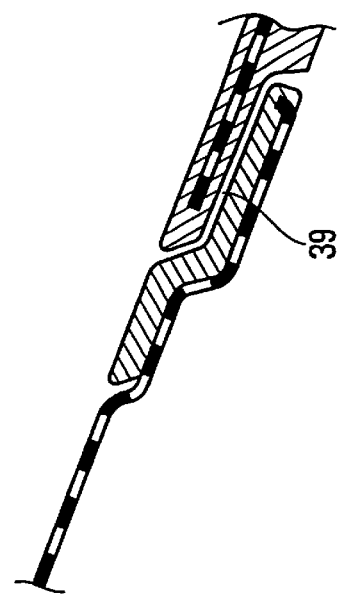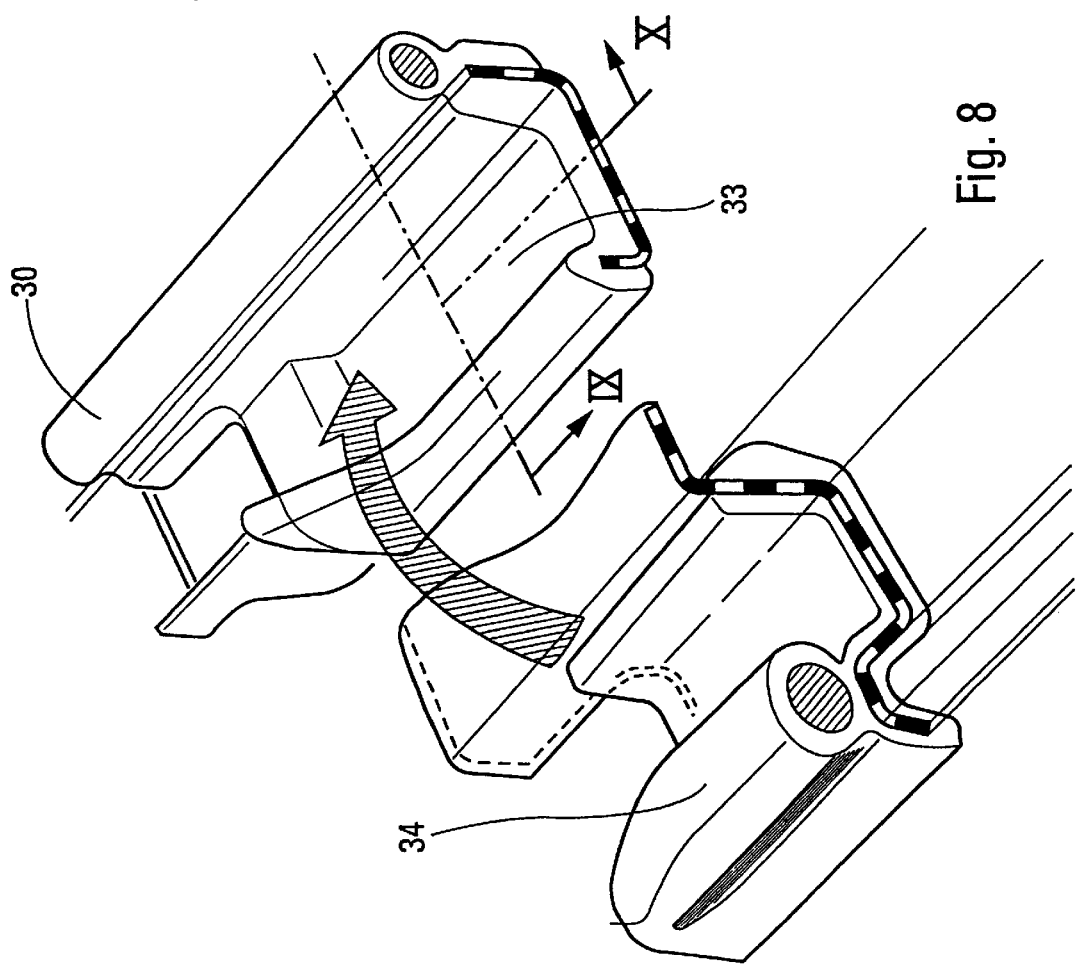

THREE-PART FOLDING ROOF FOR CONVERTIBLE VEHICLES

BACKGROUND OF THE INVENTION

1. Field of the Invention

The present invention concerns a roof which can be folded into the trunk of a convertible vehicle and which optimizes the volume available in the trunk when the roof is folded and enables the rear seat bulkhead to be positioned as far as possible toward the rear to provide more room for the rear seats.

2. Description of the Prior Art

In a conventional opening roof, as shown in FIGS. 1 and 2, the roof parts 1 and 2 are folded rearward by a parallelogram system comprising a hinge 3 attached to the bodyshell, a hinge 4 attached to the two roof parts and a rod 5 hinged to the bodyshell at 6 and to the front roof part at 7.

When the two roof parts 1, 2 have been folded into the trunk, after opening the trunk lid 8 in the direction of the arrow H, the opposite curvatures of the two roof parts result in a very large gap C, reducing commensurately the height B of the trunk and the entrance A of the trunk relative to the rear-facing panel 9.

Another disadvantage is that to optimize the dimension B the roof part 2 must be as horizontal as possible, which implies a rear seat bulkhead that is very far forward, limiting the space available for the rear seats.

An aim of the present invention is to remedy the above drawbacks.

SUMMARY OF THE INVENTION

The invention is therefore directed to a folding roof for convertible vehicles, comprising a front roof part hinged to a rear roof part whose rear end is hinged to the vehicle, the roof parts being adapted to be stowed in the trunk of the vehicle with the front roof part folded over the rear roof part connected to its hinge to the vehicle, wherein the rear roof part includes a central roof part extending as far as the hinge between the front and rear roof parts and the central roof part is hinged to the rear roof part and cooperates with means which, in the stowed position in the trunk, hold the central roof part at a distance above the rear roof part.

Positioning the central roof part above the rear roof part frees up an opening in the central roof part of the rear roof part which increases the available height in the trunk.

In an advantageous version of the invention the front roof part is hinged to the end of a rod whose other end is hinged to the vehicle and the rod is adapted to hold the front roof part in a substantially horizontal position when the rear roof part pivots toward the trunk about its hinge.

The central roof part is preferably connected and hinged to the rear roof part.

An arm emanating from the central roof part is connected to a rod one end of which is hinged to the arm and the other end of which is hinged to the bodyshell of the vehicle.

This type of mechanism enables the central roof part to pivot in the opposite direction to the rear roof part and achieves the exact required position when that roof part is folded into the trunk by virtue of a specific position of the hinges.

The central roof part can be the rear window of the roof. Other features and advantages of the invention will become more apparent in the following description, which is given with reference to the accompanying drawings, which are given by way of nonlimiting example only.

BRIEF DESCRIPTION OF THE DRAWINGS

FIG. 6 is a three-quarter perspective view from the rear of a folding roof in accordance with the invention in the closed position and in a partially open position.

FIG. 7 is a diagram illustrating how the folding roof is balanced.

FIG. 8 is a partial perspective view of the seals at the hinge between the two rear roof parts.

FIG. 9 is a view in section taken along the line IX—IX in FIG. 8.

FIG. 10 is a view in section taken along the line X—X in FIG. 8.

DETAILED DESCRIPTION OF THE PREFERRED EMBODIMENT

Figure 1:
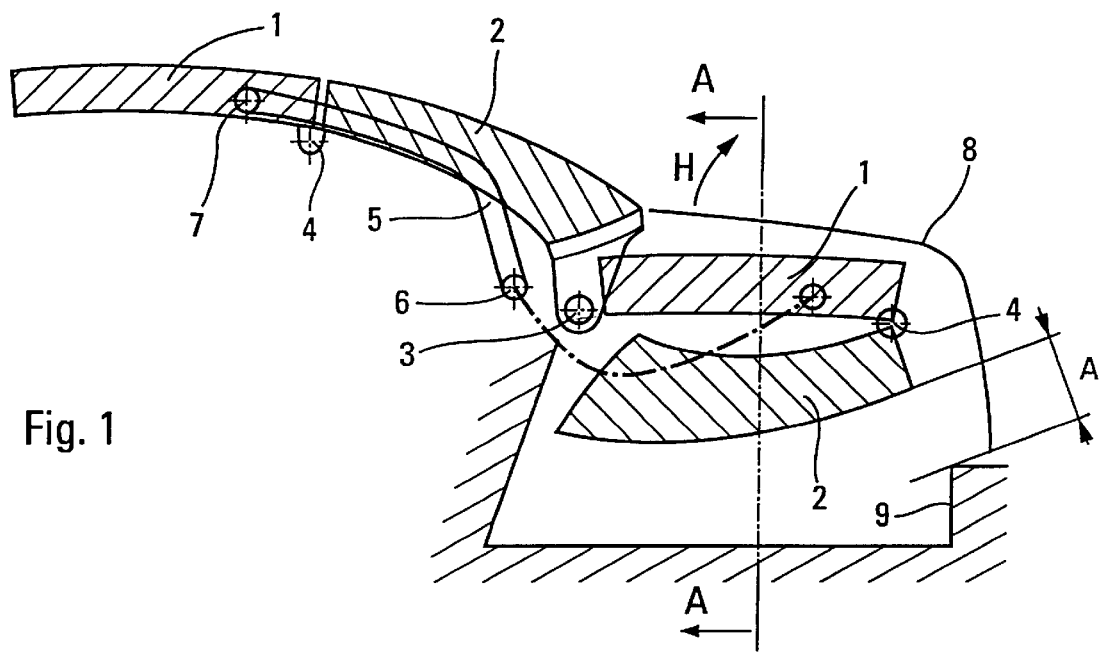
FIG. 1 is a diagrammatic view in partial longitudinal section of a vehicle equipped with a prior art folding roof.
Figure 2:
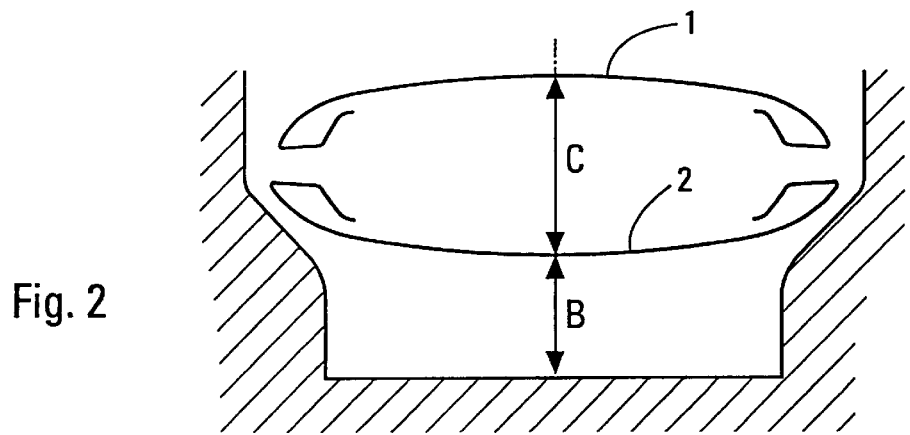
FIG. 2 is a view in section taken along the line A—A in FIG. 1.
Figure 3:
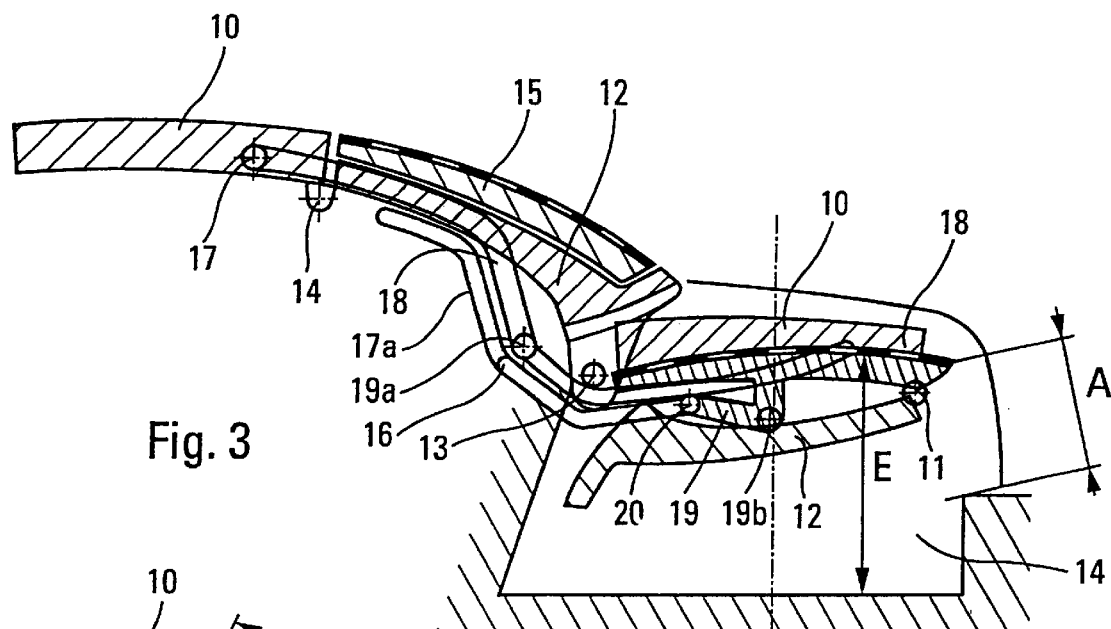
FIG. 3 is a view similar to FIG. 1 showing a folding roof in accordance with the invention.

Referring to FIGS. 3 and 6, the folding roof for a convertible vehicle comprises a front roof part 10 hinged at 11 to a rear roof part 12 the rear end 12a of which is hinged at 13 to the vehicle. The two roof parts 10, 12 can be stowed in the trunk 14 of the vehicle with the front roof part 10 folded over the rear roof part 12 connected to its hinge 13 to the vehicle.

Figure 4:
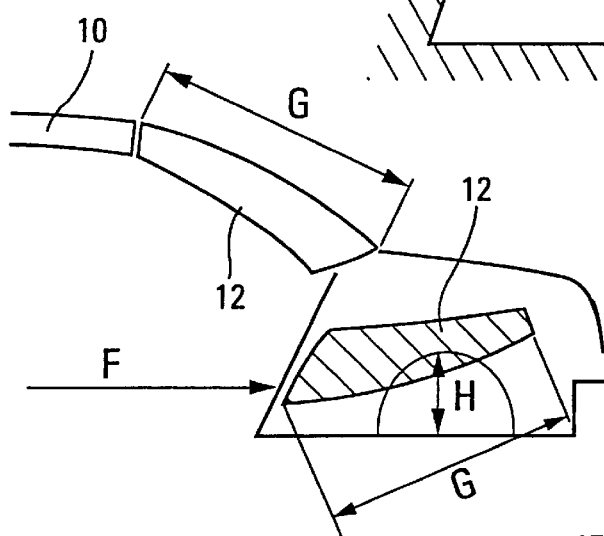
FIG. 4 is a view in section taken along the line IV—IV in FIG. 3.

In accordance with the invention, the rear roof part 12 includes a central roof part 15 extending as far as the hinge 11 between the front roof part 10 and the rear roof part 12. The central roof part 15 is hinged at 19b to the rear roof part 12 and cooperates with means which, with the roof stowed in the trunk 14, hold the central roof part 15 a distance above the rear roof part 12. This arrangement increases the height E available in the trunk 14 (see FIG. 4).

FIGS. 3 and 6 show how the front roof part 10 is hinged at 17 to the end of a rod 18 disposed on each side of the vehicle and whose other end is hinged at 19a to the vehicle. The rod 18 is adapted to hold the front roof part 10 in a substantially horizontal position during pivoting of the rear roof part 12 toward the trunk around its hinge 13.

The central roof part 15 is connected to a rod 17a by an arm 19 emanating from the central roof part and the other end of the rod 17a is hinged to the bodyshell of the vehicle at 16. The arm 19 is adapted to pivot the central roof part 15 about its hinge 19b in the opposite direction to that in which the rear roof part pivots about the hinge 13.

Each arm 19 has one end hinged at 20 to the rod 17a and one end 21 attached to the edge of the central roof part 15.

Each rod 17a has one end hinged at 20 to the arm 19 and the other end hinged at 16 to the bodyshell of the vehicle.

In the example shown, the central roof part 15 is the rear window in the roof.

FIG. 6 shows how pivoting of the roof is actuated by an electric motor 22 driving a pinion or toothed sector 25 attached to the rotation shaft 13 of the rear roof part 12 via two half-shafts 23 and a pinion 24.

The pivoting movement of the roof can be balanced by a cylinder 26.

As shown in FIG. 7, the cylinder 26 is hinged at 27 to the bodyshell of the vehicle and at 28 to the pinion 25 attached to the rotation shaft 13 of the rear roof part 12.

The operation of the folding roof as just described will now be explained.

The roof is opened by an electromechanical system. The two symmetrically disposed toothed sectors 25 attached to the roof are driven by two pinions 24 driven by the two half-shafts which are turn are driven by an electric motor 22 attached to the bodyshell.

The roof part 12 pivots toward the rear, entraining the roof part 10 to which it is hinged at 11 and which is held horizontal at all times by the rod 18 hinged to the bodyshell and to the roof part 10.

As it moves, the roof part 12 also entrains the roof part 15 hinged to it at 19b. The position of the roof part 15 relative to the roof part 12 is controlled by the arm 19 entrained by the rod 17a hinged to the arm at 20 and to the bodyshell of the vehicle at 16.

The combined movement of the roof 12 and the rod 17a, constituting two arms of a parallelogram, holds the roof part 15 in a controlled position. This avoids interference between the roof part 12 and the roof part 15 in movement. It also assures correct movement past the head of a rear seat passenger in the vehicle. It further conditions the arrival position in the trunk.

The rotation movement of the roof is balanced by the cylinder 26 hinged to the bodyshell and to the toothed sector 25. Careful placement of the cylinder pushes the roof to a neutral point 28 on opening it and then retains it, and conversely on closing the roof. This system balances the roof in nonmotorized versions and limits the motor power required in motorized versions.

Figure 5:
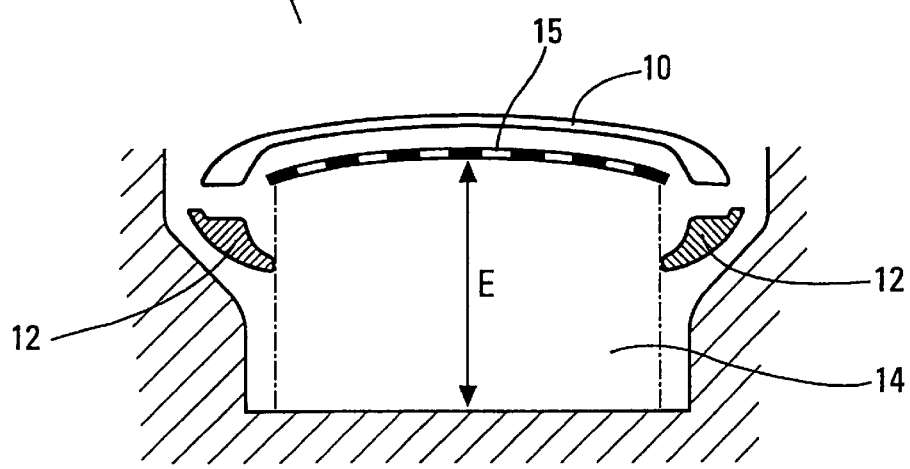
FIG. 5 is a diagrammatic view in partial longitudinal section of a vehicle equipped with a folding roof, illustrating another advantage of the invention.

Another advantage of the invention, shown by FIG. 5, is the possibility of inclining the roof part 12 as far as possible within limits set by the wheel arches and without compromising the height E of the trunk, so enabling the bulkhead 29 to be moved back as far as possible to optimize the space available for the rear seats of the vehicle.

A special design of seal is required to provide a seal at the rotation center 16, as shown in FIGS. 8, 9 and 10.

A seal 30 is clipped to a channel 31 glued or otherwise attached to the roof part 15 at 32. The channel 31 exists only in the upper part of the roof part 15 and stops at the rotation center 16 in order to escape from the roof part 12 during its rotation.

The shape of the termination 33 of the seal enables it to nest over the upper termination 34 of the seal 35 attached to the roof part 12 and clipped to a channel 36 of the roof part 12.

The channel 36 exists only in the lower part of the roof part 12 and stops at the rotation center 16 so that it can escape from the roof part 15 during its rotation.

The flexible part 37 of the seal 35 provides the bottom seal between the roof parts 12 and 15.

The flexible part 38 of the seal 33 provides the top seal between the roof parts 12 and 15.

The nesting area 39 provides a sealed connection between the two roof parts 12 and 15 (see FIG. 10).

Of course, the invention is not limited to the example just described and many modifications can be made thereto without departing from the scope of the invention.

There is claimed:

1. A folding roof in combination with a convertible vehicle, comprising a front roof part hinged to a rear roof part whose rear end is hinged to said vehicle, said roof parts being adapted to be stowed in the trunk of said vehicle with said front roof part folded over said rear roof part wherein said rear roof part includes a central roof part extending as far as the hinge between said front and rear roof parts and said central roof part is hinged to said rear roof part and cooperates with means which, in the stowed position in said trunk, hold said central roof part at a distance above said rear roof part.

2. The folding roof claimed in claim 1 wherein said front roof part is hinged to the end of a rod whose other end is hinged to said vehicle and said rod is adapted to hold said front roof part in a substantially horizontal position when said rear roof part pivots toward said trunk.

3. The folding roof claimed in claim 2 wherein said central roof part is connected to a rod by an arm emanating from said central roof part, the other end of said rod is hinged to said bodyshell of said vehicle and said arm is adapted to pivot said central roof part in the opposite direction to pivoting of said rear roof part.

4. The folding roof claimed in claim 3 wherein each arm has one end hinged to said rod and one end attached to the edge of said central roof part.

5. The folding roof claimed in claim 1 wherein said central roof part is the rear window of said roof.

6. The folding roof claimed in claim 1 wherein said roof is pivoted by an electric motor, a shaft and a pinion driving a pinion attached to the rotation shaft of said rear roof part.

7. The folding roof claimed in claim 1 wherein pivoting movement of said roof is balanced by a cylinder.

8. The folding roof claimed in claim 7 wherein said cylinder is hinged to said bodyshell of said vehicle and to said pinion attached to said rotation shaft of said rear roof part.

* * * * *